Feb. 24, 1931.  C. G. BIRO  1,793,461
MEAT CUTTER
Filed April 25, 1929  4 Sheets-Sheet 2
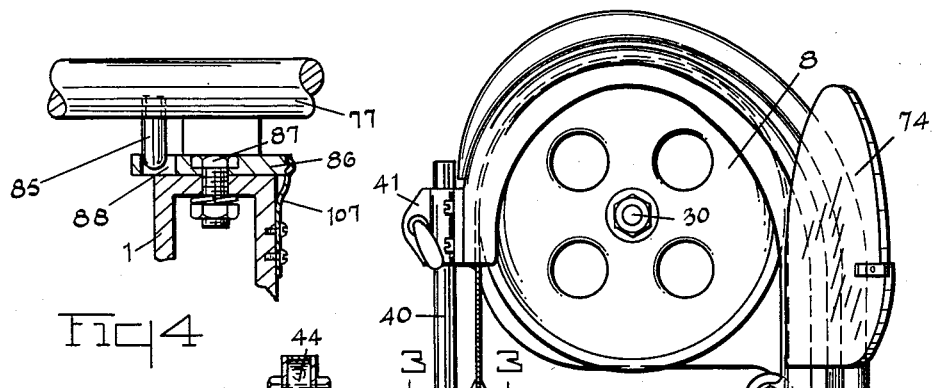
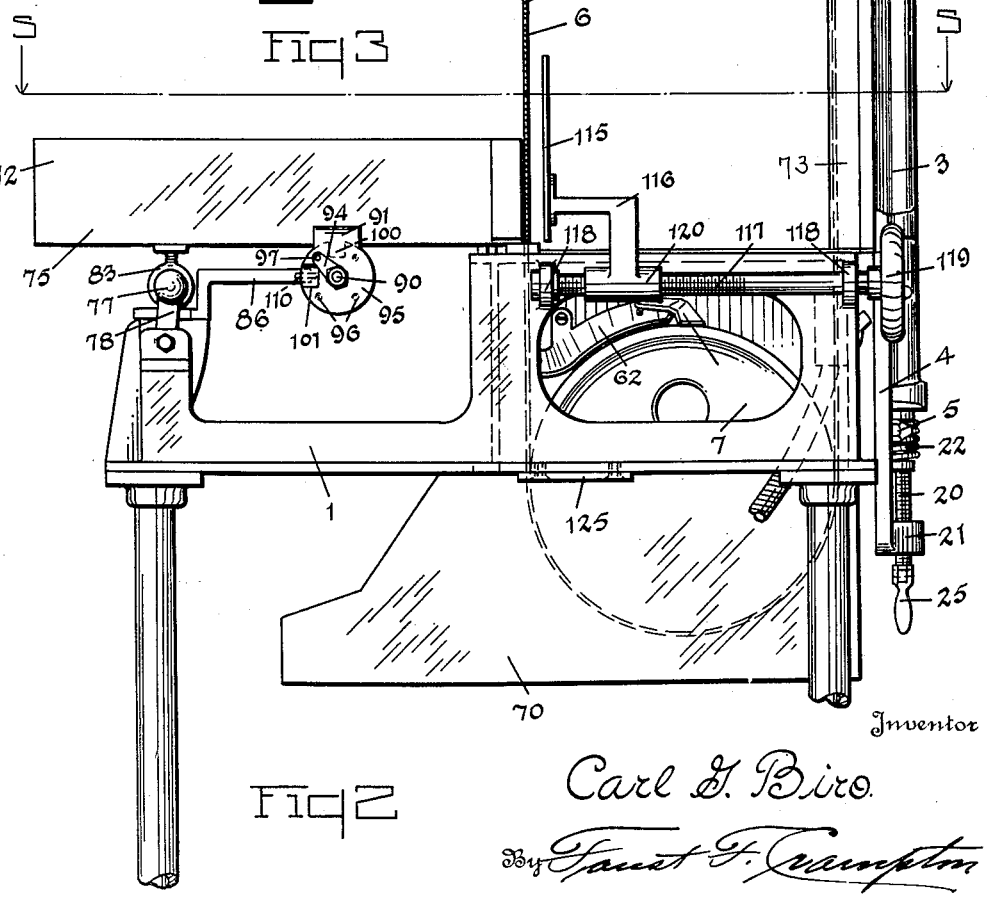
Inventor
Carl G. Biro.
By Faust F. Crampton
Attorney Feb. 24, 1931.    C. G. BIRO    1,793,461
MEAT CUTTER
Filed April 25, 1929    4 Sheets-Sheet 3
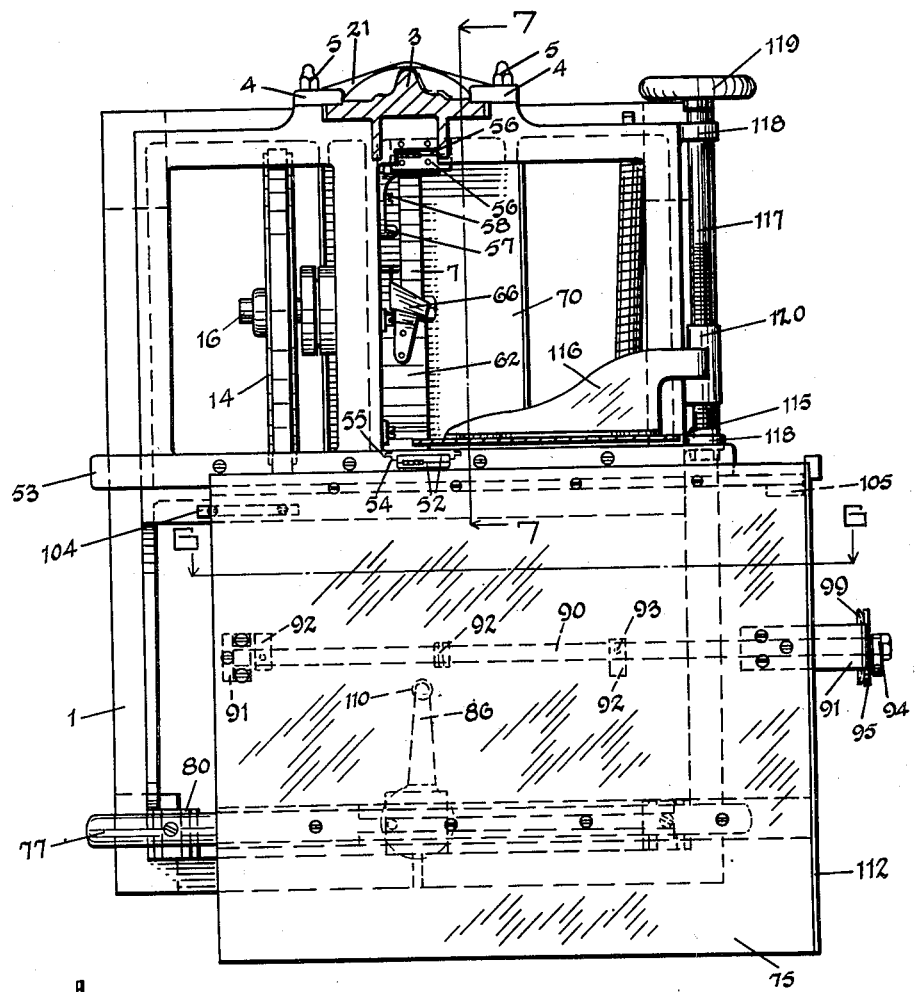
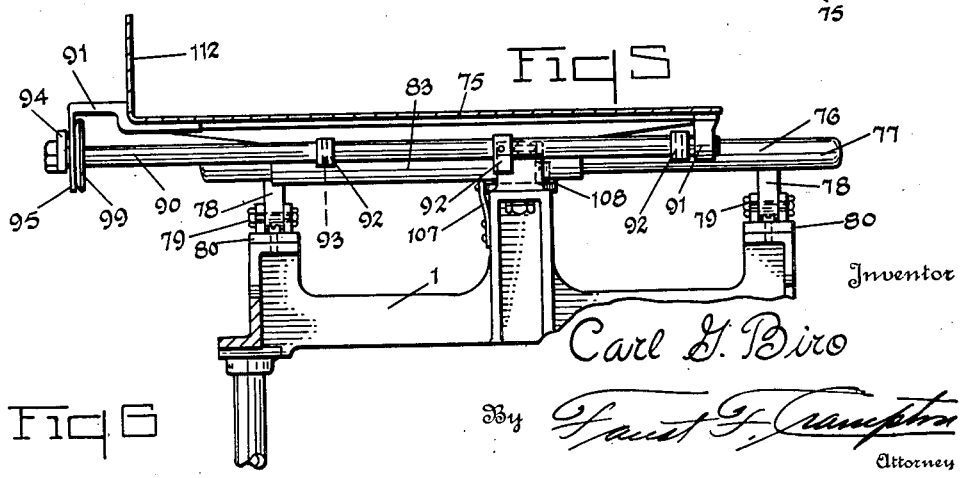
Inventor
Carl G. Biro
By [signature]
Attorney Feb. 24, 1931. C. G. BIRO 1,793,461
MEAT CUTTER
Filed April 25, 1929 4 Sheets-Sheet 4
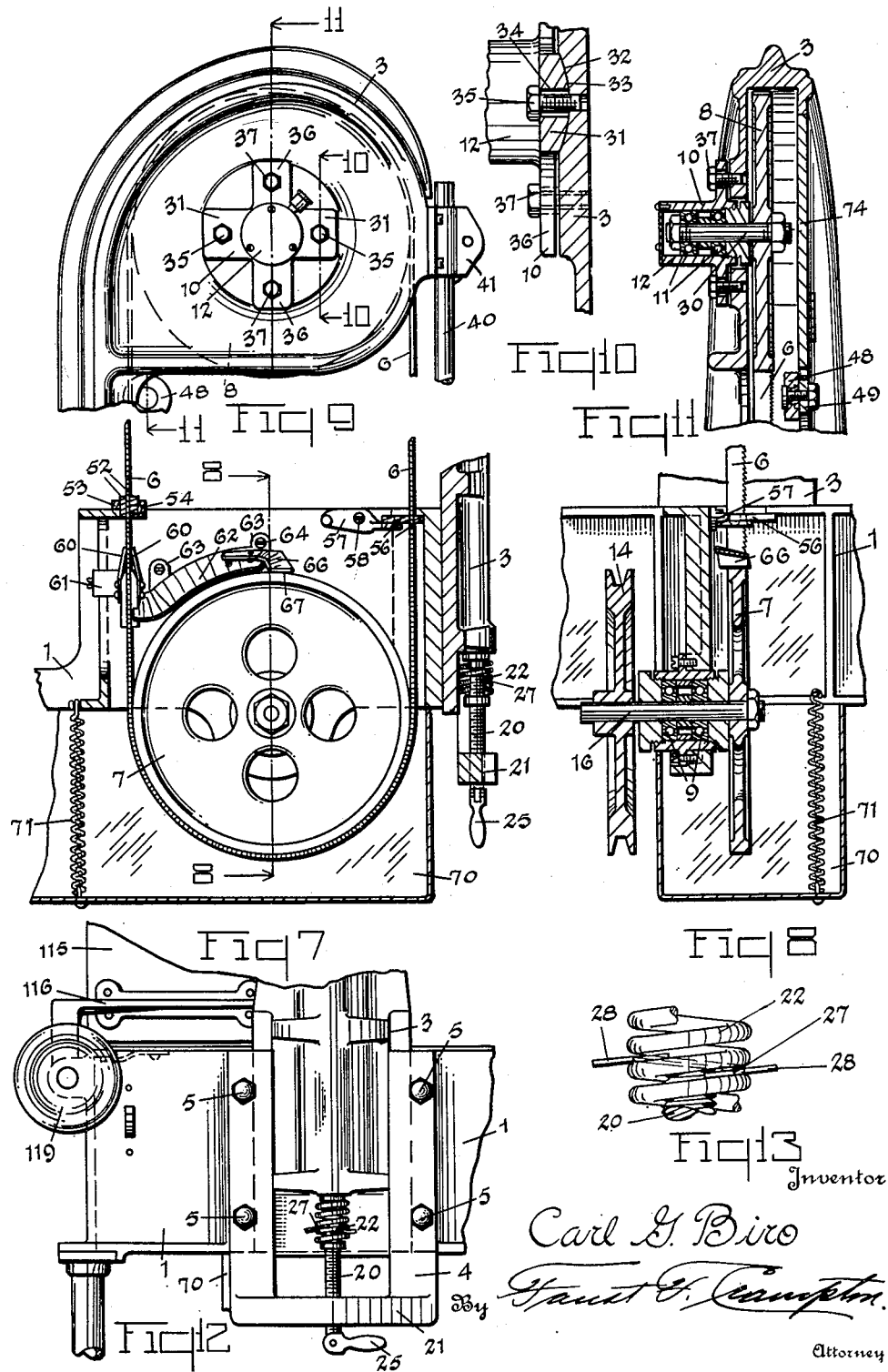
Inventor
Carl G. Biro
By
Attorney Patented Feb. 24, 1931

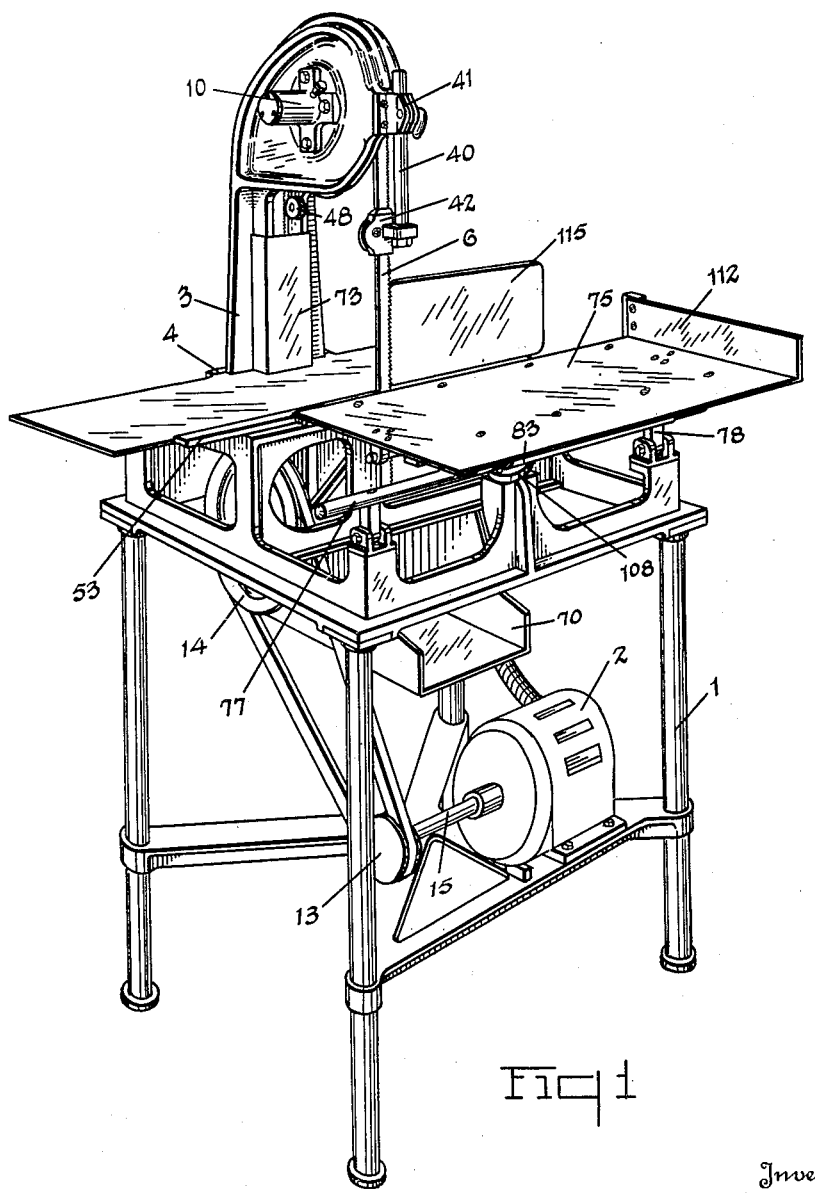

1,793,461

UNITED STATES PATENT OFFICE

CARL G. BIRO, OF MARBLEHEAD, OHIO

MEAT CUTTER

Application filed April 25, 1929. Serial No. 357,917.

My invention has for its object to provide an exceedingly efficient band saw meat cutter and slicer. The invention provides a combination of cooperative adjustable features that make possible automatic operation of saw cleaning elements, regulation of thickness of slices, and maintenance of uniformity of slices.

The invention particularly provides a means whereby a saw band may be accurately tensioned to the desired degree to avoid breaking; means whereby the pulleys of the saw band may be accurately located to prevent escape of the saw band; means for maintaining the cutting edge of the saw band in a definite position; means for removing the particles formed in the cutting from the saw band; means for uniformly feeding the meat to the saw band; and means for displacing the meat upon the return movements of the meat.

The invention may be contained in meat cutters that vary in their details of construction and, to illustrate a practical application of the invention, I have selected a meat cutter as an example of the various embodiments of my invention and shall describe it hereinafter. The particular meat cutter selected for purposes of illustration is shown in the accompanying drawings.

Fig. 1 is a perspective view of the machine. Fig. 2 is a somewhat enlarged side view of the machine. Fig. 3 is a view of a section taken on the plane of the line 3—3 indicated in Fig. 2. Fig. 4 is a broken view showing a section of a control lever. Fig. 5 is a top view of the table and a view of a section of the frame taken on the plane of the line 5—5 indicated in Fig. 2. Fig. 6 is a view of a section taken on the plane of the line 6—6 indicated in Fig. 5. Fig. 7 is a view of a section taken on the plane of the line 7—7 indicated in Fig. 5. Fig. 8 is a view of a section taken on the plane of the line 8—8 indicated in Fig. 7. Fig. 9 is a rear view of the upper end of the pulley frame. Fig. 10 is a view of a section taken on the plane of the line 10—10 indicated in Fig. 9. Fig. 11 is a view of a section taken on the planes of the broken line 11—11 indicated in Fig. 9. Fig. 12 is an end view of a part of the cutter and shows the saw adjusting mechanism. Fig. 13 is a detailed view of a mechanism for regulating the tension of the saw band.

In the form of construction shown in the drawings, the meat cutter is supported on a frame 1. It is driven by means of a motor 2, located on suitable cross bars forming a part of the frame 1. A second frame 3 is adjustably connected to the frame 1 by means of the clamping member 4 and the bolts 5. The bandsaw 6 passes over the pulleys 7 and 8, one rotatively supported in the frame 1 by means of the ball bearings 9 and the other supported on the frame 3 by means of the spider 10 having ball bearings 11 in its hub 12. The bandsaw 6 passes over the pulleys 7 and 8 and is driven by the motor 2 operating through the pulley wheels 13 and 14, one of which is connected to the shaft 15 of the motor and the other is connected to the shaft 16 that is supported on the frame 1 by the ball bearings 9.

The frame 3 is adjustably located with respect to the frame 1 by means of the screw 20 which is threaded into a nut 21 which forms a part of the clamping member 4. A spring 22 is located intermediate the end of the screw 20 and the lower end of the frame 3. To adjust the frame 3 with respect to the frame 1, the clamping members 4 are loosened by unscrewing the nuts 5 in order to permit the frame 3 to slide with respect to the frame 1 and the screw 20 is turned by means of a handle 25 that is connected to the lower end of the screw 20. The screw 20 is rotated until the spring 22 is subjected to the desired compression, the movement of the frame 3 relative to the frame 1 being resisted by the bandsaw 6 and thus the bandsaw is placed under a tension that corresponds to the compression which is produced in the spring 22 by the operation of the handle 25. The frame 3 is then clamped in its adjusted position to the frame 1.

In order to determine the degree of the tension to which the bandsaw is subjected, an indicator or a gauge 27 is inserted between two of the turns of the spring 22. The gauge 27 is a spiral strip, as shown in Fig.

12, and is provided with protruding parts 28 located diametrically to each other. The parts 28 afford a means for rotating the gauge 27. The spring 22 is formed to have a maximum resistance of a certain amount and variations of the maximum deflection or distortion will be produced by variations in pressure less than the maximum. The gauge 27 is held in place by the screw 20 which extends through the spiral strip. When, therefore, the spring has been slightly compressed by the operation of the screw 20, and consequently when the bandsaw 6 has been subjected to the proper tension, it is indicated by the looseness of the gauge which is engaged by the turns of the spring between which the gauge is located. It has been found that bandsaws readily break when the tension is too great and also they buckle when the tension is too light, and, in order to determine the proper tension of the bandsaw, and consequently to determine the proper compression of the spring 22, the spring 22 is compressed until rotation of the gauge is slightly frictionally resisted.

In order to maintain the bandsaw in position, on the pulley wheel 8, I have provided an adjustable support for adjustably locating the axis of rotation of the pulley wheel 8. The shaft 30 of the pulley wheel 8 is rotatably supported in the hub 12 of the spider 10 which is adjustable with reference to the frame 3 to angularly locate the shaft 30 with reference to the plane of the bandsaw. The spider 10 is provided with a pair of arms 31, each having a curved surface 32, and the frame 3 is provided with corresponding curved surfaces 33. The arms 31 are provided with slots 34 through which the bolts 35 extend and are threaded into the frame 3. The spider 10 is also provided with a pair of arms 36 that are disposed normally in a spaced relation with respect to the frame 3. They are held in this slightly spaced relation by the contact between the curved surfaces of the arms 31 and the frame 3. Bolts 37 extend through the arms 36 and, consequently, the angle of the axis of the pulley wheel 8 may be adjusted with reference to the plane of the bandsaw by loosening the bolts 35 and tightening and loosening one or the other of the bolts 37 to cause the contacting surfaces 32 and 33 to slide, one relative to the other, to the desired position which will locate the axis of the shaft 30 in the desired angular position to cause the pulley wheel 8 to retain the bandsaw and prevent it from being removed therefrom by the rotation induced by the pulley wheel 14 which is connected to the pulley wheel 7.

Also, the frame 3 is provided with rollers, one located at the rear of the back edge of the bandsaw in order to prevent the bandsaw from sliding from the pulley 8 by pressure produced in the cutting operations, and the other located in front of the cutting edge of the saw to properly direct the saw to the upper pulley wheel. The frame 3 is provided with an arm 40 which is adjustably connected to the frame 3 by a suitable clamping bracket 41. The lower end of the arm 40 is provided with a bracket 42 in which a ball bearing roller 44 is rotatably supported. The bracket 42 is also provided with a slot 45 in which the bandsaw slidably moves. As the meat is pressed against the cutting edge 46 of the bandsaw, the bandsaw may be pushed against the roller 44 and the bandsaw will be maintained in its position notwithstanding such pressure. The axis of the roller 44 is located at right angles to the lateral surfaces of the bandsaw 6. The frame 3 is also provided with a second roller 48 that is rotatably supported on an ear 49 that is formed on, or secured to, the frame 3. The roller 48, located in front of the bandsaw, is, preferably, formed of a fibrous material and its axis of rotation is located parallel to the sides of the bandsaw. Consequently, as the bandsaw moves forwardly, it will strike the roller 48 and the bandsaw will be fed onto the pulley 8 in a desired alignment to keep it from slipping from the pulley wheel.

In the cutting of meat by bandsaw cutters, it is well known that there is a collection of the particles of the meat and bone on the surface of the bandsaw and my invention provides means for removing the particles from the bandsaw and discharging them from the bandsaw and the parts that function with the bandsaw, or cause its operation. The frame of the machine is provided with a pair of fiber blocks 52 that are inserted in the opening formed in the bar 53. They are placed tightly together and on either side of the bandsaw 6 by means of the block 54, having suitable tongues 55 that may be inserted in channels formed in the bar 53 to lock the bar 54 in position and to lock the fiber strips 52 in the bar 53. Also, the frame 1 is provided with a pair of fiber blocks 56 that are secured in the frame 3 and about the bandsaw. One of the fiber blocks 56 is adjustably secured in position by means of the bracket 57 and a nut 58. Thus, as the bandsaw is moved, the fiber blocks 52 and 56, not only hold the bandsaw in position with reference to the pulley wheels 7 and 8, but also operate to wipe the surface of the bandsaw.

There is a good deal of material that will be carried down between the blocks 52 by the bandsaw. This material, or a large part of it, however, may be removed by a pair of scrapers 60, formed of elastic material, that are secured to a bracket 61 that is connected to the frame 1. The edges of the scrapers 60 are elastically pressed against the sides of the bandsaw 6. A guard or shield 62 is located above the pulley wheel 7 and is supported on the frame 1 by means of ears 63 and screws 64. The guard 62 has a sloping surface that will operate to deliver any particles of meat or bone to one side of the pulley wheel 7. One end of the guard 62 is connected to the bracket 61 and, as the material is scraped from the bandsaw 6 by the inner of the two scrapers 60, it will be deposited on the outer surface of the guard 62 which directs the material downward and outward to a point beyond the plane of the outer portions of the wheel 7 and, consequently, the material removed from the bandsaw will be discharged at a point beyond the plane of the pulley wheel 7. However, some of the material will pass the scrapers 60 and come in contact with the periphery of the pulley wheel 7. Since the pulley wheel 7 drives the bandsaw, it is very important that the rim of the pulley wheel 7 be kept clear from all greases, etc., that are commonly found in the particles of the meat. A scraper 66, formed of elastic material, is elastically pressed against the periphery of the wheel 7. It has a scraping edge 67 that is located at an angle to the plane of the axis of the pulley wheel 7 and inclined so as to deliver the material that may be deposited on the periphery of the pulley wheel 7 to one side. However, it has a sloping surface that extends to a point above the guard 62 and if the material is not pushed laterally, by reason of the inclined relation of the edge of the scraper 66, it will be pushed upwardly onto the guard, which, however, slopes downwardly and beyond the plane of the outer surface of the pulley wheel 7 over which the material will eventually be discharged.

In order to collect the particles that are removed from the bandsaw, a suitable pan 70 is supported by means of springs 71 connected to the bottom of the pan and to the frame 1. The pan 70 is located so as to surround the lower half of the pulley wheel 7. Also, to protect the user of the machine from the edge of the bandsaw, a suitable cover plate or sheet metal box 73 is secured to the frame 3 in order to cover and enclose that portion of the bandsaw that moves upwardly with respect to the frames 1 and 3. A cover plate 74 may be hingedly connected to the top of the frame 3 to cover the pulley wheel 8.

The meat is supported on a slidable plate 75. One edge of the plate slides on the bar 53, the other edge portion of the plate is supported by a guide 76 which comprises a rod 77 that extends parallel to the side of the bandsaw. The rod 77 is provided with a plurality of arms 78 that are pivotally connected and supported by means of the bolts 79 that extend parallel to the rod 77 and the side of the bandsaw and are located in brackets 80 which are secured to the frame 1. The plate 75 has a sleeve 83 located on its underside and surrounding the rod 77 and, consequently, as the plate 75 is moved rearwardly, the sleeve 83 moves along the rod 77. The position of the plate 75, with reference to the side of the bandsaw 6, is determined by the position of the rod 77 since the arms 78 operate to swing the rod and the plate towards and away from the side of the bandsaw.

When the plate 75 is moved rearwardly, to cut meat by the operation of the bandsaw 6, the upper portion of the meat will, by its weight and its inherent pliability, sag over the plane of the surface of that portion located near the plate and, consequently, return of the plate 75 along the same path that it took when the cut was made, will cause the overhanging portion of the meat to engage the back edge of the bandsaw which will disturb the meat in its location on the plate 75 and even prevent the return of the plate 75. Means is provided for moving the plate 75 laterally and away from the bandsaw 6 by operation of the guide 76 which is swung on the pivot bolts 79 in the direction away from the bandsaw, and consequently, on the return of the plate, the meat may be drawn back or returned along a line slightly displaced from the bandsaw so as to permit the meat to clear the bandsaw. In order to thus swing the guide 76 to one side, the rod 77 is provided with a pin 85 and a lever 86, pivotally supported on a part of the frame 1 by means of a bolt 87, is provided with a slot 88 into which the pin 85 extends. When, therefore, the lever 86 is moved, the guide 76 is swung either away from or towards the bandsaw 6. The sleeve 83 is, preferably, slotted in order to clear the pin 85 in the movement of the plate along the rod 77. The lower side of the plate is provided with a suitable member for engaging the lever 86 to cause it to swing in a direction, such as to move the rod 77 away from the bandsaw 6, at a completion of a cutting stroke of the plate and to cause the lever to swing the plate towards the bandsaw in advance of the cutting stroke of the plate.

In the particular form of construction shown, a rod 90 is rotatably supported in brackets 91 secured to the underside of the plate 75. A plurality of lugs 92 are connected to the rod so as to extend at different angles from each other about the axis of the rod and are secured, at desired points along the rod, by the pins 93. An arm 94 is connected to the rod 90 so as to rotate the rod 90 to desired points with reference to its axis. The forward bracket 91 is provided with a disc 95 which may be provided with four recesses 96. The arm 94 may be provided with a pin 97 adapted to enter the recesses 96 as the arm 94 is turned about its axis. The recesses 96 and the pin 97 locate the lugs 92 on the rod 90 in desired angular positions with reference to the horizontal. Preferably, the connections are so made that when the pin 97 engages in one of the recesses 96, one or the other of the lugs 92 will be located horizontally so as to engage the end of the lever 86. The rod 90 is also provided with a disc 99 located at the back of the disc 95. The disc 99 is provided with a notch 100 and the disc 95 is provided with a notch 101. The arm 94 is located with reference to the notch 100 so that when the pin 97 engages in one of the recesses 96, the notches 100 and 101 will be located in alignment with respect to each other. The notches 100 and 101 will then be located in line with the end of the lever 86.

When the plate 75 is moved rearwardly as to cut meat by the operation of the bandsaw 6, the disc 99 will, unless its notch is located in line with the end of the lever 86, engage the end of the lever 86 when the forward edge of the plate passes the bandsaw to cause the lever 86 to swing the rod 77 away from the bandsaw. If the arm 94 is placed in position to locate the notches 100 and 101 in alignment, the discs 95 and 99 will pass the end of the lever 86 and the plate will not be removed laterally with respect to the bandsaw. It will be returned along the same path that it took in its rearward movement. However, if the lever 86 has been operated by the disc 99, by reason of the arm 94 being located in one of the other recesses 96, the lever 86 will, on the return movement of the plate, be operated by one of the lugs 92, depending in which of the recesses 96 the pin 97 is located. This will occur, preferably, when the plate 75 has been pushed far enough forward to locate the meat in front of the bandsaw. The lever 86 will then swing the plate 75 and position the cut surface of the meat in the plane of the bandsaw. Thus, the rod 90 may be turned to anyone of the desired positions to locate a lug 92 in position to engage the lever 86, such as to locate the entire quantity of the meat substantially ahead of the bandsaw. Whereupon the meat may be pushed laterally so as to be in line with the bandsaw and upon a rearward movement of the plate 75 the meat will be cut. Thus the rod 90 is adjusted with reference to the size of the meat as measured along the direction of movement of the plate 75 so as to cause the plate to be moved laterally when the cutting has been finished. This insures a completion of the cut and also insures clearance of the meat on return of the plate.

In order to limit the outward movement of the plate, after it has been shifted by the guide, suitable stops 104 and 105 may be provided, one located on the frame 1 and the other located on the plate which will engage after the plate 75 has been moved laterally with respect to the bandsaw. If, however, the rod 90 is positioned so that the notches 100 and 101 are in line with the lever 86, the plate 75 may be moved the full width of the top of the frame 1 since there will be no engagement between the stops 104 and 105.

In order to prevent the lever 86 from being drawn to the right or the left by the operation of the lugs 92 and the disc 99, a suitable spring 107 may be pressed against the circular part 108 of the lever 86. If desired, the spring 107 may be provided with the recessed part and the lever 86 may be provided with points for engaging the spring 107 to frictionally hold the lever 86 in position. Also, if desired, the outer end of the lever 86 may be provided with a roller 110 to reduce the friction loss and resistance to its movement. The plate 75 may be provided with a part 112 that extends at right angles to the plane of the body of the plate. The part 112 forms a back wall for engaging or holding the meat in position with reference to the bandsaw 6.

In order to produce uniform slices and to provide a means for varying the thickness of the slices that may be cut by the meat cutter, a plate 115 is located in a plane at right angles to the planes of the plate 75 and its part 112. The plate 115 has an arm 116. A screw 117 is rotatably supported in ears 118 formed on the front side of the frame 1. The screw 117 may be provided with a handle 119. The arm 116 is provided with a nut or female threaded sleeve 120 in which the screw 117 is located. The position of the plate 115 is located with reference to the bandsaw 6 by means of the screw 117 which forms a stop for the meat in front of the bandsaw 6. This movement is limited according to the adjustment induced by the rotation of the screw 117. When it is desired to place a large piece of meat on the top of the frame 1, or if it is desired to cut large chunks of meat, the plate 115 may be swung down to hang over the front side of the machine by merely swinging the arm 116 on the screw 117. Thereafter, it may be replaced if it is desired to cut slices. The adjustment of the screw 117 will enable the production of uniform cuts. A bar 125 of fiber material may be secured to the frame 1 to prevent jarring of the plate 115 when it is swung downward over the side of the machine.

I claim:

1. In a meat cutter, a frame, a saw band, a pulley wheel rotatably supported on the frame and for actuating the saw band, a pulley wheel for guiding the saw band, a plate having one edge slidably supported on the first named frame, a guide comprising a rod having arms rotatably connected to the first named frame, means for connecting the rod to the plate for supporting and shifting the plate laterally with respect to the saw band, a lever pivotally supported on the frame and connected to the rod for shifting the rod to slide the plate towards or away from the saw band, and a member located on the plate for engaging the lever to shift the plate laterally with respect to the saw band when the plate has moved across the frame a predetermined distance.

2. In a meat cutter, a frame, a saw band, a pulley wheel rotatably supported on the frame and for actuating the saw band, a pulley wheel for guiding the saw band, a plate having one edge slidably supported on the first named frame, a guide comprising a rod having arms pivotally connected to the first named frame, and means for connecting the rod to the plate for supporting and shifting the plate laterally with respect to the saw band, a lever pivotally supported on the frame and connected to the rod for shifting the rod to slide the plate towards or away from the saw band, a member located on the plate for engaging the lever to shift the plate laterally with respect to the saw band, means for adjusting the member for engaging the lever to cause the operation of the lever at any one of a plurality of points in the movement of the plate across the frame.

3. In a meat cutter, a frame, a saw band, a pulley wheel rotatably supported on the frame and for actuating the saw band, a pulley wheel for guiding the saw band, a plate having one edge slidably supported on the frame, a guide comprising a rod having arms pivotally connected to the frame, means for connecting the rod to the plate for supporting and shifting the plate laterally with respect to the saw band, a lever pivotally supported on the frame and connected to the rod for shifting the rod to slide the plate towards or away from the saw band, a member located on the plate for engaging the lever to shift the plate laterally with respect to the saw band when the plate has moved across the frame a predetermined distance, means for adjusting the member for engaging the lever to cause the operation of the lever at any one of a plurality of points in the movement of the plate across the first named plate, and means for returning the plate toward the saw band upon the completion of its return movement.

4. In a meat cutter, a frame, a saw band, a pulley wheel rotatably supported on the frame and for actuating the saw band, a pulley wheel for guiding the saw band, a plate having one edge slidably supported on the frame, a guide for supporting the central part of the plate and comprising a rod having arms pivotally connected to the frame, means for moving the rod towards the saw band to move the plate towards the saw band, a rotatable rod connected to the plate having lugs in planes extending through the axis of the rod and inclined to each other, a lever pivotally supported on the frame and connected to the first named rod and engaged by one of the lugs for shifting the plate from the band saw at a point in the reciprocation of the plate, depending upon the location of the lug relative to the plate and the second named rod which engages the lever.

In witness whereof I have hereunto signed my name to this specification.

CARL G. BIRO.